April 2, 1946.  P. F. ZETNICK  2,397,900
PISTON RING EXPANDER
Filed June 11, 1943  2 Sheets-Sheet 1

Inventor
PAUL F. ZETNICK

By Samuel Scrivener Jr.
Attorney

April 2, 1946.  P. F. ZETNICK  2,397,900
PISTON RING EXPANDER
Filed June 11, 1943  2 Sheets-Sheet 2

Inventor
PAUL F. ZETNICK
By Samuel Schwein Jr.
Attorney

Patented Apr. 2, 1946

2,397,900

UNITED STATES PATENT OFFICE 2,397,900

PISTON RING EXPANDER

Paul F. Zetnick, Chicago, Ill., assignor to Associated Spring Corporation, Bristol, Conn., a corporation of Delaware Application June 11, 1943, Serial No. 490,504

8 Claims. (Cl. 309—40)

This invention relates to double-acting spring devices which expand the rings of steam-engine pistons both radially and axially of the piston. Devices of this description are known, being disclosed for example in British Patent No. 11,929 of 1889, and comprise in general a ring formed of a number of helical compression springs, which act radially of the piston, alternating with bar springs which act axially of the piston, these springs being connected by coupling forks.

It is the principal object of my invention to provide a device of the type described having novel, improved and simplified means for connecting the alternate and differently-acting springs whereby improved results are obtained and interchangeability of parts is achieved.

Other objects and features of novelty of the invention will be made apparent by the following description and the annexed drawings which, it will be understood, are only illustrative of the invention and impose no limit thereon not imposed by the appended claims.

In the drawings, in which similar reference numerals and letters refer to like parts;

Fig. 6 is a view similar to Fig. 4 but showing a modified form of axially-acting spring and a modified form of coupling fork;

Figure 1:
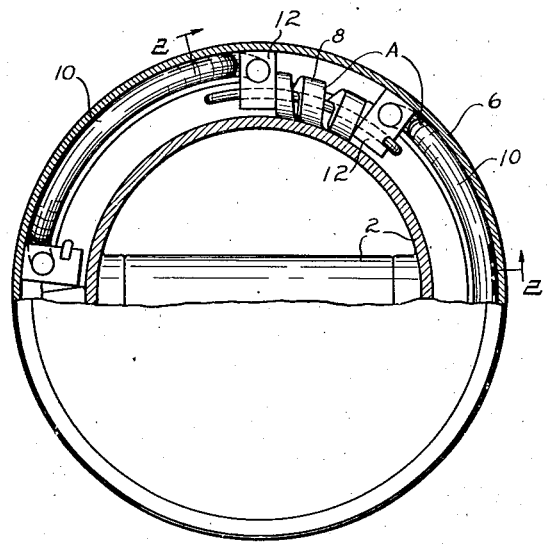
Fig. 1 is a partial plan and sectional view of a piston assembly showing an expander associated therewith which is constructed in accordance with this invention.
Figure 2:
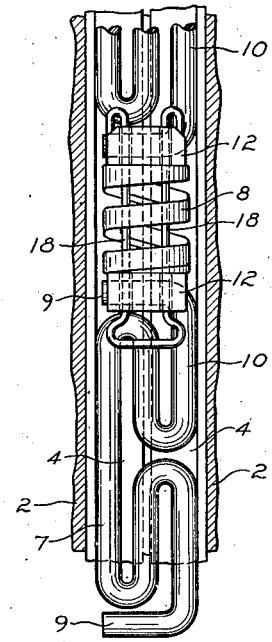
Fig. 2 is an elevation of parts of the assembly shown in Fig. 1, being taken along the line 2—2 of Fig. 1.
Figure 3:
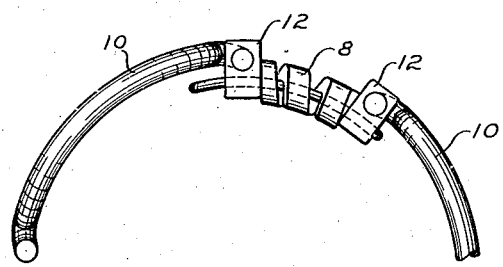
Fig. 3 is a partial plan view of the expander shown in Fig. 1.

This invention provides a new and improved double-acting spring expander for the piston rings of steam-engine pistons. The general assembly of parts in which such expanders are incorporated is illustrated in Figs. 1 and 2 and comprises a piston 2 having an annular recess in the wall thereof, within which is positioned a piston ring having the axially-separable parts 4, 4, and the annular outer wall member 6 which is adapted to operate in face-to-face contact with the inner wall of the cylinder within which the piston reciprocates. The expander is denoted generally at A and is positioned within the piston ring 6 and comprises a ring formed alternately of helical compression springs 8, which are operable to resiliently expand the piston ring circumferentially in order to cause it to engage the cylinder wall and bar springs 10 which are operable to resiliently urge the parts 4, 4 of the piston rings in opposite directions axially of the piston, all of these springs being connected in a new manner taught by this invention, to form a ring.

The axially-acting springs 10 are formed by bending a bar of steel or other suitable material backwards and forwards in the same plane to form a spring device comprising, preferably, two facing, S-shaped parts which are integrally connected to a common arm 7 to form the double-S-shape device shown in the drawings, each end 9 of the bar being turned in the plane of the finished spring to provide a means for connecting a helical spring thereto. The spring device which is so formed may be bent out of its original plane to the curvature of the piston and when it is received within the piston ring groove thereof it is placed under compression axially of the piston and at right angles to its own length in order that it will exert a constant force on the two parts 4 of the piston ring, urging them in opposite directions axially of the piston.

Figure 5:
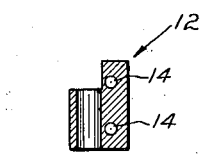
Fig. 5 is a sectional view of a connecting block according to the invention, being taken on line 5—5 of Fig. 4.
Figure 7:
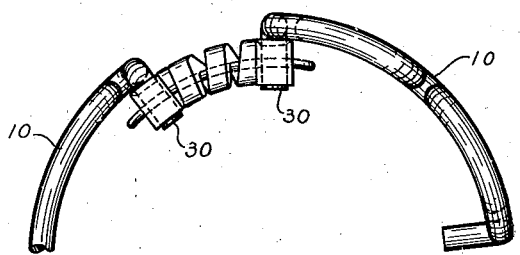
Fig. 7 is a partial plan view of an expander according to the invention having a modified form of axially-acting spring and a modified form of connecting block.
Figure 8:
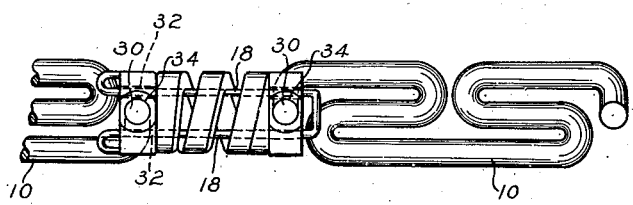

Means are provided by the invention for connecting the bar springs 10 to the helical springs 8. Such means comprise connecting blocks 12, one of which is shown in Fig. 5, and each of which is formed generally as a rectangular parallelopiped one side of which is longer than the other. Spaced, parallel holes 14 are formed in the longer side and extend therethrough, and a single hole 16 is formed in the shorter side and extends therethrough in a direction at right angles to that of the holes 14 and in a position spaced laterally from the plane of the axes of the two holes 14. One of these blocks is so positioned at each end of each helical spring 8 that the holes 14 therein are parallel to the axis of the spring, the legs 18, 18 of a coupling fork being passed through the openings 14 of one of the blocks, through the spring and through the holes 14 in the second block. The spring is compressed and the ends of the legs 18 bent back upon themselves, as at 20, thereby holding the parts in assembled relation and the spring 8 under compression. Bar springs 10 are attached to each end of the helical spring assembly by inserting an end 9 of each bar spring into the opening 16 of the adjacent block 12, the complete expander ring being formed by connecting the block at each end of each helical spring assembly to a bar spring until a ring is formed.

By making the side of block 12 in which the opening 16 is formed shorter than the other side the curved part of the bar spring between the main body thereof and the end part 9 is accommodated and a free pivoting action between adjacent members of the ring and about the axis of each end part 9 is permitted.

Figure 4:
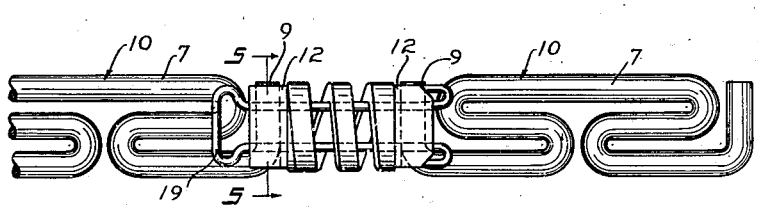
Fig. 4 is a partial side view of the expander of Fig. 3.

As shown in Fig. 4, all of the bar springs 10 may be arranged similarly, i. e. with all of the end parts 9 thereof extending in the same direction, for example upwardly as shown in Fig. 4. Alternatively, however, the positions of the bar springs may be alternately reversed, as shown in Fig. 6, so that the end parts 9 of adjacent bar springs extend in opposite directions. In order to effect this change it is only necessary that the connecting blocks 12 at the opposite ends of each helical spring assembly be oppositely disposed in order that the curved part of each end part 9 will be properly accommodated within the cut-out part of each block 12.

The coupling fork of Fig. 4 is provided with an enlarged head 19 but, if desired, this may be replaced by a fork having straight sides and no enlarged head, as shown in Fig. 6.

Figure 8:
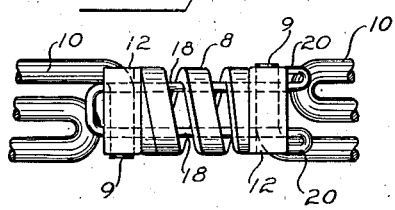
Fig. 8 is an elevation of the expander illustrated in Fig. 7.
Figure 9:
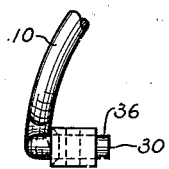
Figs. 9 and 10 are, respectively, side and front view of the connecting block shown in Figs. 7 and 8.
Figure 10:
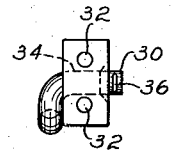

In Figs. 7, 8, 9 and 10 of the drawings is disclosed a modified form of the invention in which the ends 30 of each bar spring 10 are turned at right angles to the general plane of the spring instead of being disposed within such plane as in the embodiment disclosed in Figs. 1 to 6, inclusive. In order to accommodate this modified construction a connecting block as disclosed in Figs. 9 and 10 is provided and comprises a generally rectangular parallelopiped having two spaced, parallel holes 32 therethrough which receive the legs 18 of the coupling fork, and having a third hole 34 extending therethrough at right angles to and between the holes 32 and which is adapted to receive the end 30 of a bar spring. As shown in Fig. 8 each end part 30 extends at right angles to the general plane of the bar spring approximately midway between the upper and lower edges thereof and is received within the hole 34 in one of the connecting blocks, the other holes 32 therein receiving the legs 18 of the coupling fork.

As shown in Figs. 9 and 10 the wall of each end part of each bar spring may be grooved adjacent the extremity thereof, as at 36, to receive means, such as a wire fastener, for preventing accidental separation of the bar spring from the helical spring.

It will be seen that by this invention I have provided a simple, easily installed and easily adjusted means for coupling together the parts of a double-acting piston ring expander and that by the invention simplification of the structure of the bar and helical springs, as well as other parts of the expander, is achieved. While I have illustrated and described but two embodiments of my invention it will be apparent to those skilled in the art that further embodiments and improvements may be made without departing from the spirit or scope of the invention, for the limits of which reference must be had to the appended claims.

What is claimed is:

1. A double-acting expander for piston rings comprising a ring formed of alternate helical compression springs for exerting pressure radially of the piston and bar springs for exerting pressure axially of the piston and having elongated end parts, and means for connecting said helical springs and bar springs comprising a member attached to each end of each helical spring and having an opening therethrough within which the elongated end part of a bar spring is received.

2. A double-acting expander for piston rings comprising a ring formed of alternate helical compression springs for exerting pressure radially of the piston and bar springs for exerting pressure axially of the piston and having elongated end parts, and means for connecting said helical springs and bar springs comprising a member at each end of each helical spring having spaced holes therethrough which are parallel to the axis of the spring, a U-shaped coupling fork having two legs which extending respectively through the parallel holes in said member and the free ends of which are turned to prevent removal of the member therefrom, said member having a third hole therein extending at right angles to the parallel holes therein and within which the elongated end part of a bar spring is adapted to be received.

3. A double-acting expander for piston rings comprising a ring formed of alternate helical compressing springs for exerting pressure radially of the piston and bar springs for exerting pressure axially of the piston and having elongated end parts, and means for connecting said helical springs and bar springs comprising a member at each end of each helical spring having spaced holes therethrough which are parallel to the axis of the spring, a U-shaped coupling fork having two legs which extend respectively through the parallel holes in said member and the free ends of which are turned to prevent removal of the member therefrom, said member having a third hole therein extending at right angles to and laterally spaced from the parallel holes therein and within which the elongated end part of a bar spring is adapted to be received.

4. A double-acting expander for piston rings comprising a ring formed of alternate helical compression springs for exerting pressure radially of the piston and bar springs for exerting pressure axially of the piston and having elongated end parts, and means for connecting said helical springs and bar springs comprising a member at each end of each helical spring having spaced holes therethrough which are parallel to the axis of the spring, a U-shaped coupling fork having two legs which extend respectively through the parallel holes in said member and the free ends of which are turned to prevent removal of the member therefrom, said member having a third hole therein extending at right angles to and between the parallel holes therein and within which the elongated end part of a bar spring is adapted to be received.

5. A device for connecting adjacent spring devices which form a double-acting expander for piston rings, comprising a block in the form of a rectangular parallelopiped having a relatively long side and a relatively short side, the relatively long side having two spaced parallel holes therethrough and the relatively short side having one hole therethrough the axis of which is at right angles to and spaced laterally from the parallel axes of the two holes through the relatively long side.

6. A device for connecting adjacent spring devices which form a double-acting expander for piston rings, comprising a block in the form of a rectangular parallelopiped having two spaced parallel holes therethrough and having a third hole therethrough which is between the first two and is at right angles to the parallel axes thereof.

7. A spring device for a double-acting expander for piston rings, comprising two facing S-shaped parts having integrally connected upper arms and being curved to conform to the cylindrical bottom wall of the ring groove of a piston, the lower arm of each S-shaped part being extended to provide a linear, free-ended part extending at right angles to the lower arm in the direction of the upper arm and lying within the curve of the S-shaped parts.

8. A spring device for a double-acting expander for piston rings, comprising two facing S-shaped parts having integrally connected upper arms and being curved to conform to the cylindrical bottom wall of the ring groove of a piston, the lower arm of each S-shaped part being extended to provide a linear, free-ended part extending at right angles to the lower arm in a direction radially inward of the curve of the S-shaped parts.

PAUL F. ZETNICK.